June 9, 1931.  E. A. CONNER  1,809,023
STRANDED BELT
Filed Sept. 11, 1926
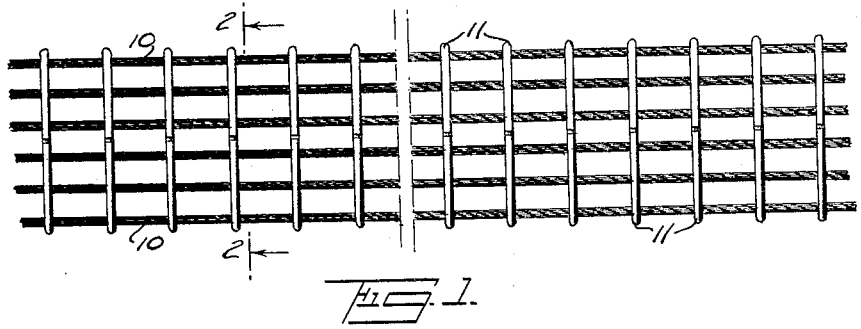
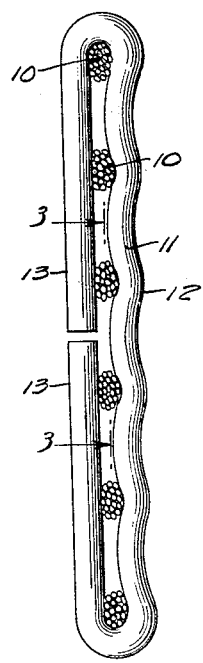
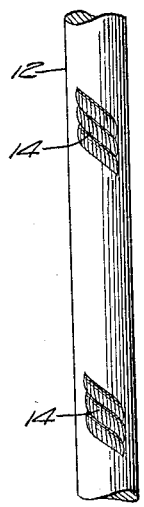
INVENTOR
EDWARD A. CONNER
BY
Frederick S. Duncan, ATTORNEY Patented June 9, 1931

1,809,023

UNITED STATES PATENT OFFICE

EDWARD A. CONNER, OF STRATFORD, CONNECTICUT, ASSIGNOR TO AMERICAN CABLE COMPANY, INC., A CORPORATION OF DELAWARE

STRANDED BELT

Application filed September 11, 1926. Serial No. 134,796.

This invention relates to belts, and more particularly to belts for power transmission and similar uses, and an object of my invention is to provide a belt made of metal ropes or flexible metallic tension members held in spaced relation by relatively rigid transverse clips.

My improved belt is particularly adapted for use as a leader for introducing brake linings into treatment tanks. However, I do not limit my invention to this particular application but also contemplate the use of my improved belt for power transmission and for other purposes.

An object of my invention is to provide a belt having great tensile strength and little weight, and which will not only be very flexible to transverse bending, but will also have limited lateral and torsional flexibility.

Another object of my invention is to provide a cable belt of extremely simple and economical construction involving no soldered or welded joints.

Other objects will appear in the following description of an embodiment of my invention.

In the accompanying drawings:

Figure 1 shows a side view of a piece of my improved cable belt;

Figure 2 is an enlarged cross-section taken on the line 2—2 in Figure 1; and

Figure 3 shows a fragment of one of the transverse clips as viewed in the direction of arrows 3—3 in Figure 1.

My improved stranded belt comprises a plurality of tension members 10 held in mutually spaced relation by means of transverse clips 11. The tension members consist preferably of metallic ropes composed of spirally twisted strands of relatively fine wire, so that the rope will be extremely flexible and yet possess great tensile strength.

The transverse clips 11 are preferably formed of relatively heavy wire. Each clip comprises a body portion 12 which bears against the ropes on one side of the belt, and two end portions 13 which are folded back upon the ropes on the other side of the belt. The end portions are preferably long enough to meet midway of the belt, as shown clearly in Figure 2. The belt is preferably made of an even number of tension members 10, so that the meeting point of the end portions 13 will not coincide with one of the tension members. If an odd number of tension members is used, one of the portions 13 is made longer than the other so that no tension member will lie along the meeting points of the portions 13.

The clip 11 after being folded over the tension members 10 is compressed, pressing the body portion 12 in between the tension members and giving said body portion an undulatory form. The pressure applied to the clips is sufficient to flatten the tension members at their points of intersection with the clips, so that the clips cannot slide lengthwise of the belt. The clips are made of relatively soft material so that the tension members will bite into the inner walls of the clips making indentations 14 therein, which prevent the tension members from sliding transversely of the belt. The parts of the belt are thus held in proper spaced relation both transversely and lengthwise. If spirally twisted rope is used for the tension members the indentations 14 in the clips will be spirally inclined with respect to the axes of the clips, as illustrated in Figure 3, and these inclined indentations will not only resist relative sliding of the clips and cable transversely with the belt, but also lengthwise of the belt.

It will be evident that the belt may be bent freely on an axis parallel to the clips. Because of the flexibility of the cables, the joints between the cables and the clips are not rigid but possess sufficient flexibility to permit of limited curvature of the belt edgewise and also torsionally. The belt is thus adapted for a wide variety of uses.

I claim:

1. A belt comprising a plurality of longitudinal tension members each comprising a stranded structure composed of helically wound wires and disposed in mutally spaced relation and a plurality of transversely disposed clips folded over and engaging opposite sides of said tension members, the tension members being flattened at their points of intersection with the clips and the clips being bent in between the tension members.

2. A belt comprising a plurality of wire ropes disposed in mutally spaced relation and a transversely disposed clip clamped upon said ropes, the clip being formed of compressible material and the ropes being formed of spirally twisted strands embedded by compression in said clip.

3. A belt comprising a plurality of wire ropes disposed in mutually spaced relation, a plurality of transversely disposed clips clamped upon said ropes, each clip being formed of a body portion bearing against one side of the ropes and a pair of end portions folded over and bearing against the opposite side of the ropes, the ropes being flattened at their points of intersection with the clip and said body portion being bent in between said ropes.

4. A belt comprising a plurality of wire ropes disposed in mutually spaced relation, a plurality of transversely disposed clips clamped upon said ropes, each clip being formed of a body portion bearing against one side of the ropes and a pair of end portions folded over and bearing against the opposite side of the ropes, the ropes being flattened at their points of intersection with the clip and said body portion being indented at said points of intersection.

5. A belt comprising a plurality of wire ropes disposed in mutually spaced relation, a plurality of transversely disposed clips clamped upon said ropes, each clip being formed of a body portion bearing against one side of the ropes and a pair of end portions folded over and bearing against the opposite side of the ropes, the ropes being flattened at their points of intersection with the clip, and said body portion and end portions being indented at said points of intersection.

6. A belt comprising a plurality of wire ropes disposed in mutually spaced relation, a plurality of transversely disposed clips clamped upon said ropes, each clip being formed of a body portion bearing against one side of the ropes and a pair of end portions folded over and bearing against the opposite side of the ropes, the ropes being flattened at their points of intersection with the clip, said body portion and said end portions being idented at said points of intersection, and said body portion being bent in between said ropes.

7. A belt comprising a plurality of wire ropes dispösed in mutually spaced relation and a plurality of transversely disposed clips clamped upon said ropes, each clip being formed of a body portion bearing against one side of the ropes and a pair of end portions folded over and bearing against the opposite side of the ropes, said end portions terminating intermediate between two of said ropes, the ropes being flattened at their points of intersection with the clip and said body portion and said end portions being indented at said points of intersection.

8. A belt comprising a plurality of stranded wire members disposed in parallel relation and a plurality of transversely disposed clips clamped in mutually spaced relation upon said stranded wire members, said clips being formed of compressible material and said stranded wire members being formed of spirally twisted wire components embedded by compression in said clips.

In testimony whereof, I have signed this specification.

EDWARD A. CONNER.